United States Patent
Nadig (10) Patent No.: US 10,692,092 B2
(45) Date of Patent: Jun. 23, 2020

(54) SYSTEM AND METHOD FOR PROVIDING ON-LINE ADVERTISING WITH DYNAMIC CONTENT

(75) Inventor: Deepak Seetharam Nadig, San Jose, CA (US)

(73) Assignee: eBay Inc., San Jose, CA (US)

( * ) Notice: Subject to any disclaimer, the term of this patent is extended or adjusted under 35 U.S.C. 154(b) by 1054 days.

(21) Appl. No.: 11/962,321

(22) Filed: Dec. 21, 2007

(65) Prior Publication Data

US 2009/0164312 A1    Jun. 25, 2009

(51) Int. Cl.
*G06Q 30/02*    (2012.01)

(52) U.S. Cl.
CPC ......... *G06Q 30/02* (2013.01); *G06Q 30/0277* (2013.01)

(58) Field of Classification Search
CPC .............. G06Q 30/02; G06Q 30/0277; G06Q 30/0269; G06Q 30/00; G06Q 30/0256; G06Q 30/0275
USPC ... 705/10, 14, 14.4, 14.61, 14.66, 14.73, 26, 705/14.54, 14.71, 14.69; 709/217, 218, 709/224, 203, 219; 725/35; 707/1
See application file for complete search history.

(56) References Cited

U.S. PATENT DOCUMENTS

| | | | |
|---|---|---|---|
| 5,778,368 A | 7/1998 | Hogan et al. | |
| 5,787,254 A | 7/1998 | Maddalozzo, Jr. et al. | |
| 5,802,299 A | 9/1998 | Logan et al. | |
| 5,819,092 A | 10/1998 | Ferguson et al. | |
| 5,835,712 A | 11/1998 | DuFresne | |
| 5,884,035 A * | 3/1999 | Butman | G06F 17/3089 707/999.01 |
| 5,948,054 A | 9/1999 | Nielsen | |
| 5,948,061 A | 9/1999 | Merriman et al. | |
| 5,999,912 A * | 12/1999 | Wodarz | G06Q 30/02 705/14.61 |
| 6,029,141 A | 2/2000 | Bezos et al. | |
| 6,167,426 A | 12/2000 | Payne et al. | |
| 6,266,684 B1 | 7/2001 | Kraus et al. | |
| 6,275,854 B1 * | 8/2001 | Himmel | G06F 11/3419 705/14.68 |
| 6,285,998 B1 | 9/2001 | Black et al. | |

(Continued)

FOREIGN PATENT DOCUMENTS

| | | |
|---|---|---|
| CN | 1659537 A | 8/2005 |
| CN | 1949770 A | 4/2007 |

(Continued)

OTHER PUBLICATIONS

•Chris Double, More on Ajax and server push, Bluish Coder, Infinity Ex, The Official Infiniti Ex Site, Research Build. New Zealand, Nov. 14, 2005.*

(Continued)

*Primary Examiner* — Jessica Lemieux
(74) *Attorney, Agent, or Firm* — Shook, Hardy & Bacon (57) ABSTRACT

A computer-implemented system and method for providing on-line advertising with dynamic content is disclosed. The system in an example embodiment includes an advertisement (ad) generator configured to provide an advertisement template with an embedded region for dynamic content; to retrieve dynamic content; to modify the presentation of the advertisement to include the dynamic content; and to serve the modified advertisement including the dynamic content to a user.

19 Claims, 8 Drawing Sheets

(56) References Cited

U.S. PATENT DOCUMENTS

| | | | |
|---|---|---|---|
| 6,297,819 B1 | 10/2001 | Furst | |
| 6,307,573 B1 | 10/2001 | Barros | |
| 6,321,209 B1 | 11/2001 | Pasquali | |
| 6,332,150 B1 | 12/2001 | Khan et al. | |
| 6,407,759 B1 | 6/2002 | Kanungo et al. | |
| 6,493,733 B1 | 12/2002 | Pollack et al. | |
| 6,519,571 B1* | 2/2003 | Guheen | G06Q 30/02 705/14.66 |
| 6,615,238 B1 | 9/2003 | Melet et al. | |
| 6,631,402 B1 | 10/2003 | Devine et al. | |
| 6,701,343 B1 | 3/2004 | Kenyon | |
| 6,721,795 B1 | 4/2004 | Eldreth | |
| 6,772,200 B1* | 8/2004 | Bakshi | G06F 17/30905 707/E17.121 |
| 6,826,594 B1* | 11/2004 | Pettersen | G06F 17/30893 705/59 |
| 6,847,992 B1* | 1/2005 | Haitsuka | G06Q 30/02 705/14.73 |
| 6,892,226 B1* | 5/2005 | Tso | G06Q 30/0207 709/218 |
| 6,917,961 B2 | 7/2005 | Melet et al. | |
| 7,024,464 B1* | 4/2006 | Lusher | G06F 17/30905 707/E17.121 |
| 7,194,424 B2* | 3/2007 | Greer | G06Q 30/02 705/14.66 |
| 7,216,297 B1 | 5/2007 | Douglis et al. | |
| 7,233,973 B2 | 6/2007 | Melet et al. | |
| 7,865,420 B1* | 1/2011 | Daman | G06Q 30/0621 705/26.5 |
| 7,979,417 B1* | 7/2011 | Bharat | G06F 17/30867 707/709 |
| 8,438,469 B1* | 5/2013 | Scott | G06F 17/24 715/230 |
| 2001/0018667 A1* | 8/2001 | Kim | G06Q 30/02 705/14.73 |
| 2001/0025274 A1* | 9/2001 | Zehr | G06Q 10/107 705/402 |
| 2002/0036654 A1 | 3/2002 | Evans et al. | |
| 2002/0107701 A1 | 8/2002 | Batty et al. | |
| 2002/0133817 A1* | 9/2002 | Markel | G06Q 30/02 725/23 |
| 2003/0023489 A1* | 1/2003 | McGuire | G06Q 30/02 705/14.55 |
| 2003/0040970 A1 | 2/2003 | Miller | |
| 2003/0048294 A1 | 3/2003 | Arnold | |
| 2003/0204624 A1* | 10/2003 | Kushner | H04L 29/06 709/242 |
| 2003/0212759 A1* | 11/2003 | Wu | G06Q 30/02 709/218 |
| 2003/0220866 A1* | 11/2003 | Pisaris-Henderson | G06Q 30/02 705/37 |
| 2004/0093376 A1* | 5/2004 | De Boor | H04M 1/274558 709/203 |
| 2004/0107160 A1* | 6/2004 | Goclowski | G06Q 30/0601 705/37 |
| 2005/0234781 A1* | 10/2005 | Morgenstern | G06Q 30/00 705/14.16 |
| 2006/0184620 A1 | 8/2006 | Melet et al. | |
| 2006/0230058 A1* | 10/2006 | Morris | G06Q 10/063 |
| 2006/0242596 A1* | 10/2006 | Armstrong | G06F 3/0485 715/786 |
| 2006/0259371 A1* | 11/2006 | Perrier | G06F 17/30595 705/27.1 |
| 2007/0055748 A1* | 3/2007 | Kim | G06F 17/30896 709/219 |
| 2007/0094232 A1* | 4/2007 | Dill | G06F 17/30719 |
| 2007/0106789 A1* | 5/2007 | Blumenau | G06F 11/34 709/224 |
| 2007/0150353 A1* | 6/2007 | Krassner | G06Q 30/00 705/14.64 |
| 2007/0192352 A1* | 8/2007 | Levy | G06F 17/3002 |
| 2007/0208610 A1* | 9/2007 | Pisaris-Henderson | G06F 17/30899 705/14.1 |
| 2007/0260520 A1 | 11/2007 | Jha et al. | |
| 2007/0265923 A1* | 11/2007 | Krassner | G06Q 30/02 705/14.51 |
| 2008/0021775 A1* | 1/2008 | Lerman | G06Q 30/02 705/14.73 |
| 2008/0065974 A1* | 3/2008 | Campbell | G06Q 10/107 715/200 |
| 2008/0077494 A1* | 3/2008 | Ozveren | G06Q 30/0212 705/14.14 |
| 2008/0077955 A1* | 3/2008 | Haberman | G06Q 30/02 725/35 |
| 2008/0091532 A1* | 4/2008 | Silverbrook | G06Q 30/02 705/14.49 |
| 2008/0103901 A1* | 5/2008 | Lapstun | G06F 3/0317 705/14.5 |
| 2008/0109306 A1* | 5/2008 | Maigret | G06F 21/10 705/14.46 |
| 2008/0140770 A1* | 6/2008 | DelloStritto | H04L 67/10 709/203 |
| 2008/0215428 A1* | 9/2008 | Ramer | G06Q 30/02 705/14.53 |
| 2008/0221987 A1* | 9/2008 | Sundaresan | G06Q 30/02 705/14.54 |
| 2008/0235383 A1* | 9/2008 | Schneider | G06F 17/30887 709/229 |
| 2008/0262908 A1* | 10/2008 | Broady | G06Q 30/02 705/14.66 |
| 2008/0313229 A1* | 12/2008 | Taswell | G06Q 20/208 |
| 2008/0319839 A1* | 12/2008 | Olliphant | G06Q 30/02 705/14.54 |
| 2009/0006214 A1* | 1/2009 | Lerman | G06Q 30/0277 705/14.73 |
| 2009/0012868 A1* | 1/2009 | DeAngelis | G06Q 30/02 705/14.5 |
| 2009/0030788 A1* | 1/2009 | Boudah | G06Q 30/02 705/14.71 |
| 2009/0063262 A1* | 3/2009 | Mason | G06Q 30/0256 705/14.54 |
| 2009/0089151 A1* | 4/2009 | Protheroe | G06Q 10/00 705/14.69 |
| 2009/0132349 A1* | 5/2009 | Berkley | G06F 17/30896 715/202 |
| 2009/0199230 A1* | 8/2009 | Kumar | G06Q 30/02 725/32 |
| 2009/0265245 A1* | 10/2009 | Wright | G06Q 30/02 705/14.66 |
| 2010/0223113 A1* | 9/2010 | Lee | 705/14.4 |
| 2010/0223143 A1* | 9/2010 | Lee | 705/14.73 |
| 2010/0223144 A1* | 9/2010 | Lee | 705/14.73 |

FOREIGN PATENT DOCUMENTS

| | | |
|---|---|---|
| WO | WO-07127166 A2 | 11/2007 |
| WO | WO-2007127166 A2 | 11/2007 |
| WO | WO-09085197 A2 | 7/2009 |
| WO | WO-09085197 A3 | 7/2009 |

OTHER PUBLICATIONS

•Haberman; Seth (U.S. Appl. No. 60/794,624 of US 20080077955) discloses: Systems and Methods for Generating Media Content using Microtrends.*

"International Application Serial No. PCT/US2008/013877, Search Report dated Jul. 17, 2009", 7 pgs.

"International Application Serial No. PCT/US2008/013877, Written Opinion dated Jul. 17, 2009", 4 pgs.

"European Application Serial No. 08866211.9, Extended European Search dated Aug. 4, 2011", 6 pgs.

"Chinese Application Serial No. 200880127365.3, First Office Action dated Jul. 29, 2011", 10 pgs.

"Chinese Application Serial No. 200880127365.3, FIRST Office Action Response filed Dec. 8, 2011", 11 pgs.

(56) References Cited

OTHER PUBLICATIONS

"European Application Serial No. 08866211.9-2221, Office Action Response filed Jan. 31, 2012", 13 pgs.

"Korean Application Serial No. 2010-7016386, Office Action dated Oct. 7, 2011".

"Chinese Application Serial No. 200880127365.3, Voluntary Amendment filed May 10, 2011", 7 pgs.

"International Application Serial No. PCT/US2008013877, International Preliminary Report dated Jul. 1, 2010", 6 pgs.

"Chinese Application Serial No. 200880127365.3, Office Action dated May 18, 2012", 12 pgs.

"Korean Application Serial No. 2010-7016386, Appeal Response filed Jun. 18, 2012 to Final Office Action dated Mar. 16, 2012", 10 pgs.

"Chinese Application Serial No. 200880127365.3, Office Action dated Mar. 4, 2013", with English translation of claims, 21 pgs.

"Chinese Application Serial No. 200880127365.3, Response filed Sep. 24, 2012 to Office Action dated May 18, 2012", with English translation of claims, 8 pgs.

"Korean Application Serial No. 2010-7016386, Notice of Allowance dated Jul. 23, 2012", with English translation., 3 pgs.

"Chinese Application Serial No. 200880127365.3, Office Action dated Jan. 22, 2014", with English translation of claims, 21 pgs.

"Chinese Application Serial No. 200880127365.3, Office Action dated Aug. 28, 2013", with English translation of claims, 16 pgs.

"Chinese Application Serial No. 200880127365.3, Response filed May 5, 2014 to Office Action dated Jan. 22, 2014", with English translation of claims, 19 pgs.

"Chinese Application Serial No. 200880127365.3, Response filed May 20, 2013 to Office Action dated Mar. 4, 2013", with English translation of claims & machine translation, 20 pgs.

"Chinese Application Serial No. 200880127365.3, Response filed Nov. 12, 2013 to Office Action dated Aug. 28, 2013", with English translation of claims & machine translation, 16 pgs.

"European Application Serial No. 08866211.9, Examination Notification Art. 94(3) dated Oct. 10, 2013", 8 pgs.

Decision on Reexamination received for Chinese Patent Application No. 200880127365.3, dated Nov. 23, 2015, 27 pages (15 pages of Official copy and 12 pages of English Translation).

First Examiner Report received for Indian Patent Application No. 4886/DELNP/2010, dated Apr. 5, 2017, 9 pages.

Office Action received for Korean Patent Application No. 10-2010-7016386, dated Mar. 16, 2012, 7 pages (3 pages of Official copy and 4 paged of English Translation).

Office Action received for Korean Patent Application No. 10-2010-7016386, dated Sep. 14, 2011, 6 pages (3 pages of English Translation and 3 pages of Official Copy).

Response to Office Action filed on Jul. 24, 2015 for Chinese Patent Application No. 200880127365.3, dated Jun. 11, 2015, 8 pages (2 pages of English Pending Claims and 6 pages of Official copy).

Response to Office Action filed on Nov. 14, 2011 for Korean Patent Application No. 10-2010-7016386, dated Sep. 14, 2011, 32 pages (28 pages of Official copy and 4 pages of English Pending Claims).

Office Action received for Chinese Patent Application No. 200880127365.3, dated Jun. 11, 2015, 5 pages (Official copy only).

\* cited by examiner

Providing On-line Advertising with Dynamic Content Processing Logic
-700-

Provide an advertisement template with an embedded region for dynamic content.
-702-

Retrieve dynamic content.
-704-

Modify the presentation of the advertisement to include the dynamic content.
-706-

Serve the modified advertisement including the dynamic content to a user.
-708-

End

SYSTEM AND METHOD FOR PROVIDING ON-LINE ADVERTISING WITH DYNAMIC CONTENT

BACKGROUND

Technical Field

This disclosure relates to methods and systems supporting online advertising. More particularly, the present disclosure relates to providing on-line advertising with dynamic content.

Related Art

An increasingly popular way of delivering on-line (e.g. Internet) advertisements is to tie the presentation of advertisements to particular user behaviors. Such user behaviors include user access to a particular web page, user selection (also called mouse-clicking or clicking) of a particular location on a web page, user entry of a particular search string or keyword, and the like. In order to target advertising accurately, advertisers or vendors pay to have their advertisements presented in response to certain kinds of events—that is, their advertisements are presented when particular user behaviors warrant such presentation. If a particular advertisement (ad) leads to some user action, an advertiser may receive remuneration for the ad.

Using other systems and processes on the Web, users can search for goods and services via the Internet and shop, bid, or make purchases of goods or services over the Internet in real time. On-line shopping, and especially on-line auctions or bidding, can cause rapid and frequent changes in information related to particular products and/or services offered by on-line merchants or in on-line auctions. For example, the bidding price of an item at auction can change by the minute. However, there is a significant latency between the creation of an ad related to a product/service and the publishing of the ad on the Internet for shoppers or bidders. This makes it difficult to create ads for products/services that may have associated information that gets stale (e.g. goes out of date) quickly (e.g. price, or product/service availability information). Unfortunately, conventional systems only serve static advertisements that may not contain updated dynamic content that includes the latest information available for related goods and/or services.

Conventional ad servers use static advertisements with static content created by an advertiser. These types of ads can quickly go out of date. Hence, conventional ads can only lead a user to another website or another item page where the user can get up-to-date information related to the ad and the products/services being offered by the ad.

U.S. Pat. No. 5,948,061 discloses methods and apparatuses for targeting the delivery of advertisements over a network such as the Internet. Statistics are compiled on individual users and networks and the use of the advertisements is tracked to permit targeting of the advertisements of individual users. In response to requests from affiliated sites, an advertising server transmits to people accessing the page of a site an appropriate one of the advertisements based upon profiling of users and networks. However, the served advertisement does not have updated dynamic content that includes the latest information available for related goods and/or services.

Thus, a computer-implemented system and method for providing on-line advertising with dynamic content is needed.

BRIEF DESCRIPTION OF THE DRAWINGS

Embodiments illustrated by way of example and not limitation in the figures of the accompanying drawings, in which.

DETAILED DESCRIPTION

A computer-implemented system and method for providing on-line advertising with dynamic content is disclosed. In the following description, numerous specific details are set forth. However, it is understood that embodiments may be practiced without these specific details. In other instances, well-known processes, structures and techniques have not been shown in detail in order not to obscure the clarity of this description.

As described farther below, according to various example embodiments of the disclosed subject matter described and claimed herein, there is provided a computer-implemented system and method for providing on-line advertising with dynamic content. The example system includes an advertisement (ad) generator to obtain dynamic ad information and to modify the presentation of advertising to the user based upon the dynamic ad information. Various embodiments are described below in connection with the figures provided herein.

Typical contextual advertising implementations show advertisements that are textually or visually related to the content or products/services that the user is browsing or has browsed or products/services the user has previously purchased. However, even targeted advertising for targeting ad content to particular users can produce errant or annoying ad content that may not be considered relevant, timely, or useful to the user. As such, it would be beneficial to modify the content of an ad in real-time with the latest information related to, for example, the current price of a product/item. The various embodiments described herein enable the user to configure ads in real-time with dynamic content. In particular, as described in more detail below, ads can be created with placeholders (template regions) for dynamic information that can change frequently (e.g. item price, item availability, time left for bidding on the item, etc.). This dynamic information is retrieved in real-time by the ad when the ad is published, or the dynamic information is retrieved in real-time and pushed to the ad when the ad is published.

An example embodiment is described in the following section. Referring to FIGS. 1-4, an example advertisement 310 is illustrated. Ad 310 represents a typical ad displayed to an on-line computer user in conventional systems. Such an ad 310 may have been automatically selected for display to a particular user (i.e. targeted) because of the user's previous behavior or demographics.

Figure 1:
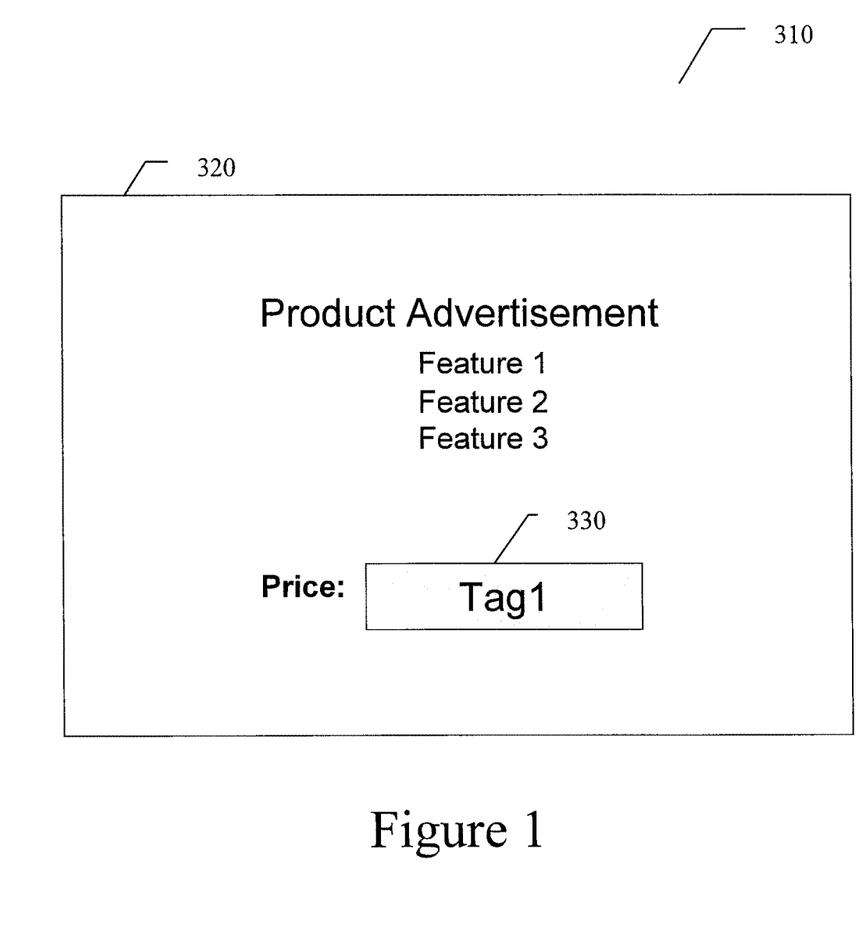
FIGS. 1-4 illustrate example advertisements with dynamic content in an example embodiment.
Figure 2:
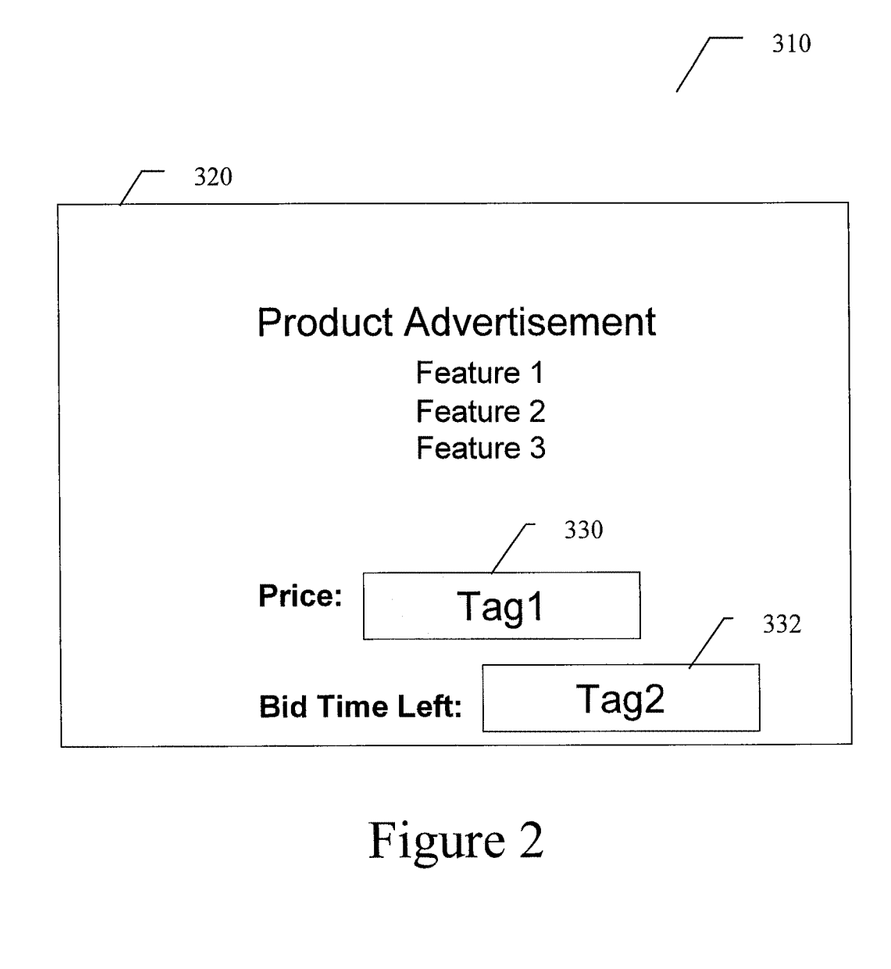
Figure 3:
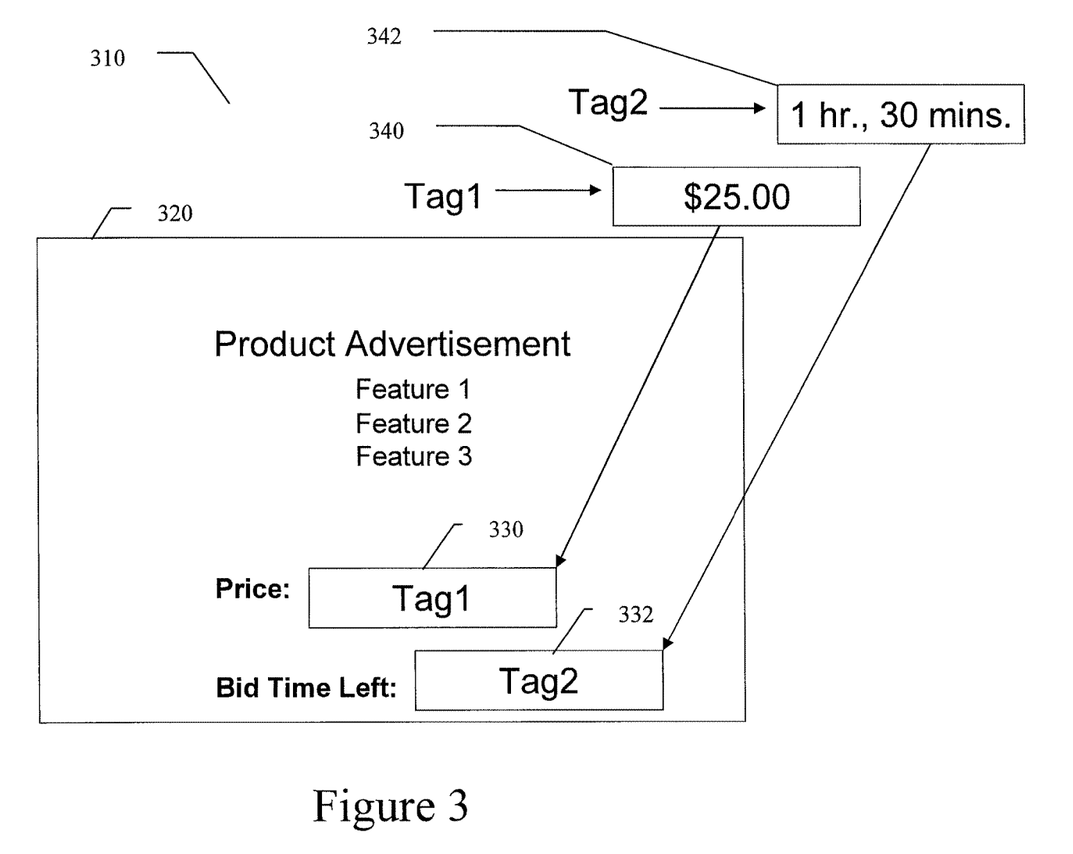

Referring to FIGS. 1-4, an example embodiment includes an example advertisement 310 having static portions 320 and a template region 330 reserved for dynamic ad content. As shown in FIG. 2, ad 310 can include a plurality of template regions 330 and 332 reserved for dynamic ad content. Each of the template regions 330 and 332 can include a tag including a link or other information identifying a source for dynamic information from which dynamic content for the particular template region can be retrieved. In one embodiment, the tag can include a link including a mechanism for retrieving or subscribing to the dynamic content. In a particular embodiment, the tag can be a Uniform Resource Locator (URL). As shown in the example of FIG. 2, template region 330 includes a tag, "TAG1" and template region 332 includes a tag, "TAG2". Referring now to FIG. 3, "TAG1" is shown to represent a pointer or link to the source 340 for the dynamic content intended for template region 330. Similarly, "TAG2" is shown to represent a pointer or link to the source 342 for the dynamic content intended for template region 332. The sources for these items of dynamic content can be websites, databases, or the like. In one embodiment, the tag can include a link including a mechanism for retrieving or subscribing to the dynamic content.

Figure 4:
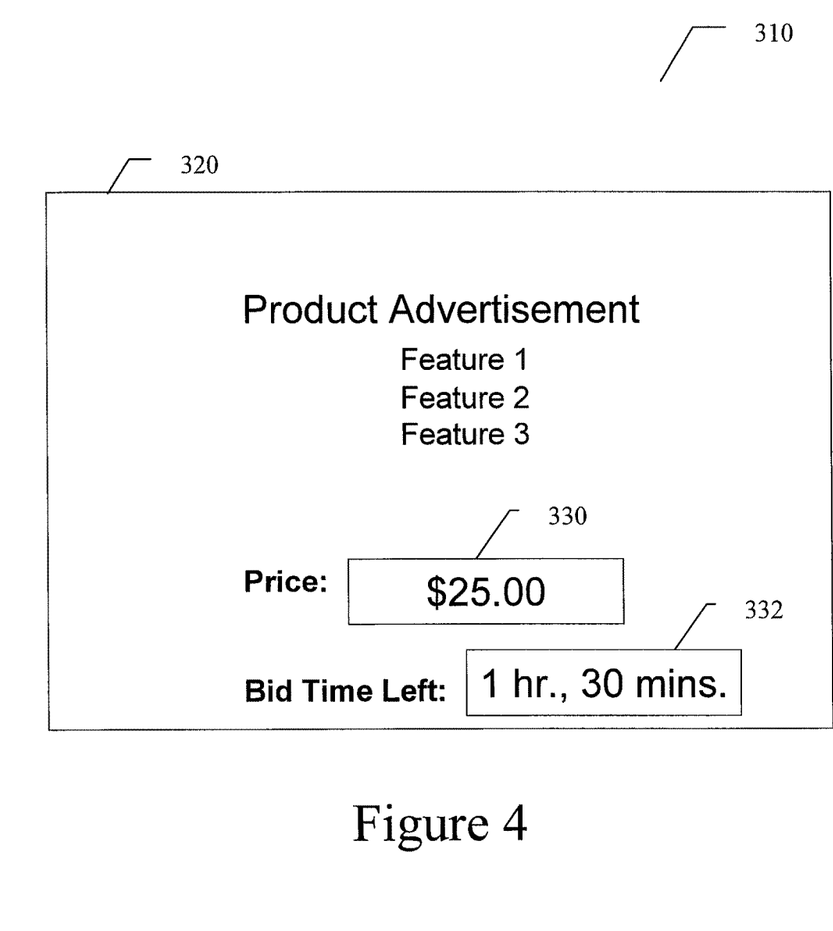

When ad 310 is served to a specific user at a specific time, the static portion 320 of the ad can be retrieved in a standard manner. In a particular embodiment, the static portion 320 of the ad includes at least one template region for dynamic content as described above. The template region can also include a tag that links the template region to a source of dynamic content for that template region. As part of serving the ad 310, the tag of the template region can be used to access and retrieve the dynamic content for that template region as shown in FIG. 3. Once the dynamic content is retrieved as described above, the dynamic content can be inserted into or overlaid upon the template region thereby appearing as part of the integrated ad 310 as shown in FIG. 4. In this manner, ad 310 is modified to include the dynamic content in regions 330 and 332 as shown in FIG. 4.

In one embodiment, advertisers create ad templates with tags that can pull data for insertion into a template region. In an alternative embodiment, advertisers can subscribe to data change events, which use the tags to push data into a template region. These tags can be used to retrieve the dynamic ad content. The dynamic ad content is then added to the ad template to create a composite ad with dynamic content. These ads can contain information related to a variety of products and/or services. The dynamic ad content enables the ad to be presented with up-to-date information relative to the offered products and/or services. The ads with the dynamic ad content can be served to a user on the web, to a user via email, or via any other advertising channel.

When the ad is served in a particular embodiment, the container of the ad (e.g. browser, email system, etc.) can perform the following operations:
  a. In a dynamic content pull model, the ad container can make a call to a data server that queries for the latest dynamic content and then displays the ad with the dynamic content.
  b. In the dynamic content push model, the ad container can subscribe to data change events with the data server. As the data changes on the server, the latest dynamic content is pushed to the template region of the ad and the ad with the new dynamic content is displayed.

Figure 5:
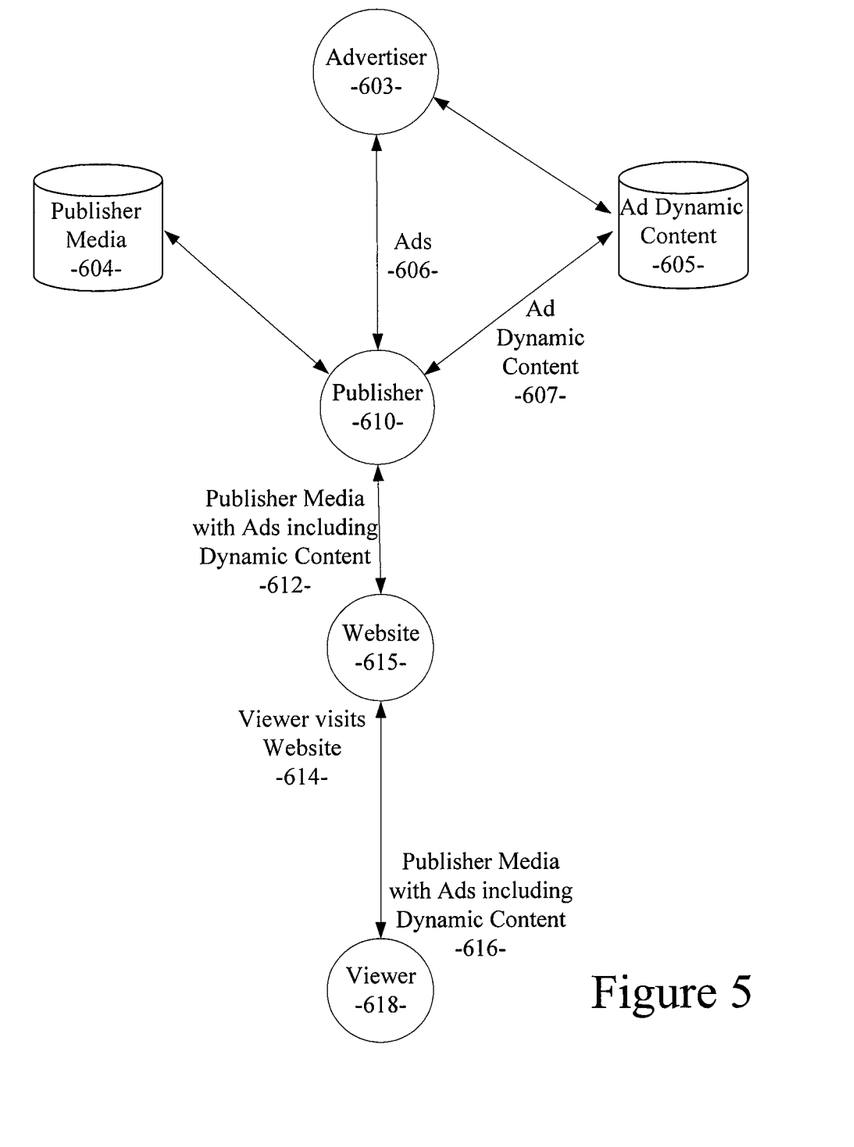
FIG. 5 illustrates a system architecture for delivering advertising with dynamic content to users in a networked system.

FIG. 5 illustrates a system architecture for delivering advertising with dynamic content to users in a networked system. Referring to FIG. 5, a system can provide components and techniques for manipulating networked ad content. For example, a publishing system 610 can be used to insert a static advertisement (ad) 606 with template regions obtained from an advertiser 603 into publisher media 604 at a publisher (or other) website 615 (a website is one type of media or networked content). In an alternative embodiment, the static advertisement (ad) 606 with template regions can also be delivered to an email server or other content rendering device or system. To accomplish this ad insertion, the publisher 610 can insert a segment of code provided by the advertising partner 603 into the publisher website's 615 source code. Once the static ad 606 is inserted into the publisher code, the tags in the static ad 606 can be used to retrieve corresponding dynamic content from an ad dynamic content source 605, such as a website, database, or other data store. In one embodiment, the tag can include a link including a mechanism for retrieving or subscribing to the dynamic content. In this embodiment, the ad dynamic content is directly served to the viewer (e.g. browser). The browser can either directly pull the dynamic content from the link in the tag (e.g. using Javascript script tag), or the browser can receive events by subscribing to that link (e.g. using AJAX push).

The dynamic content is merged with the static ad at the corresponding template regions and the resulting ad with integrated dynamic content 612 is posted on the website 615. This ad with integrated dynamic content 612 is then rendered when the page is viewed by a viewer 618.

Figure 6:
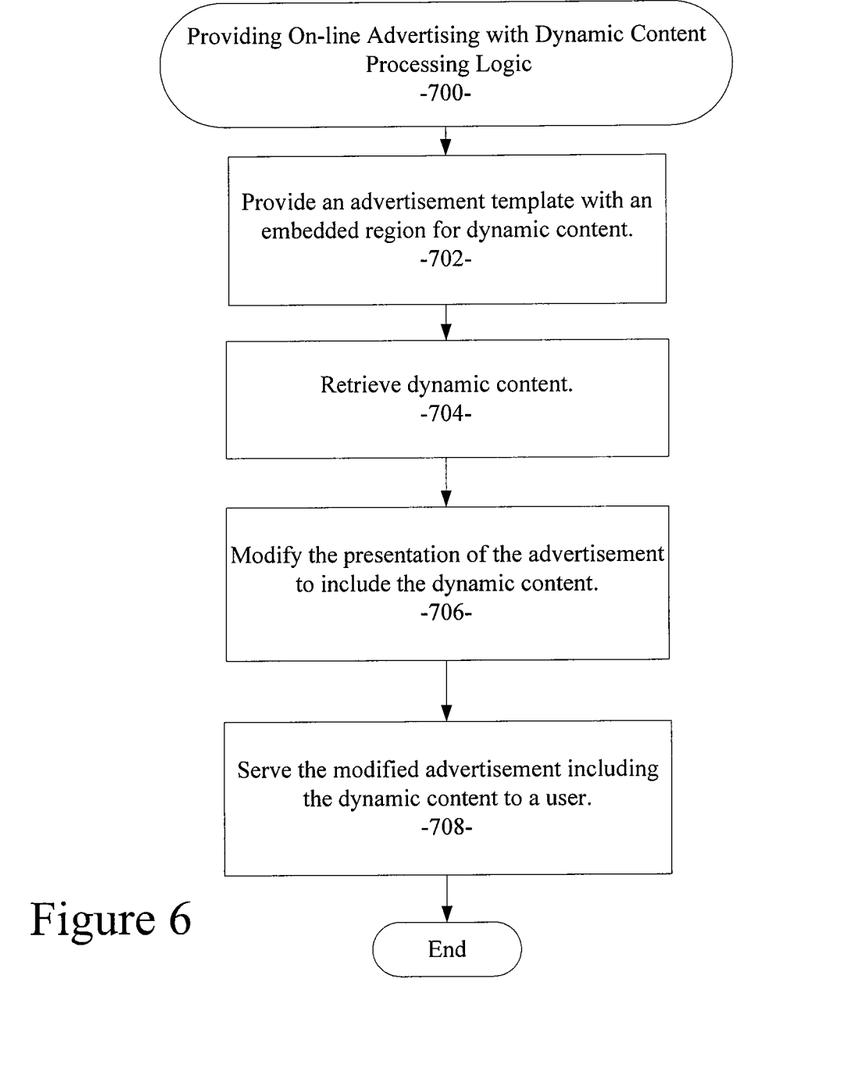
FIG. 6 is a processing flow diagram of an example embodiment.

FIG. 6 illustrates a processing flow for an example embodiment. The system includes an advertisement (ad) generator to obtain dynamic ad information and to modify the presentation of advertising to the user based upon the dynamic ad information. The example embodiment of the advertisement (ad) generator is configured to provide an advertisement template with an embedded region for dynamic content (processing block 702); retrieve dynamic content (processing block 704); modify the presentation of the advertisement to include the dynamic content (processing block 706); and serve the modified advertisement including the dynamic content to a user (processing block 708).

Figure 7:
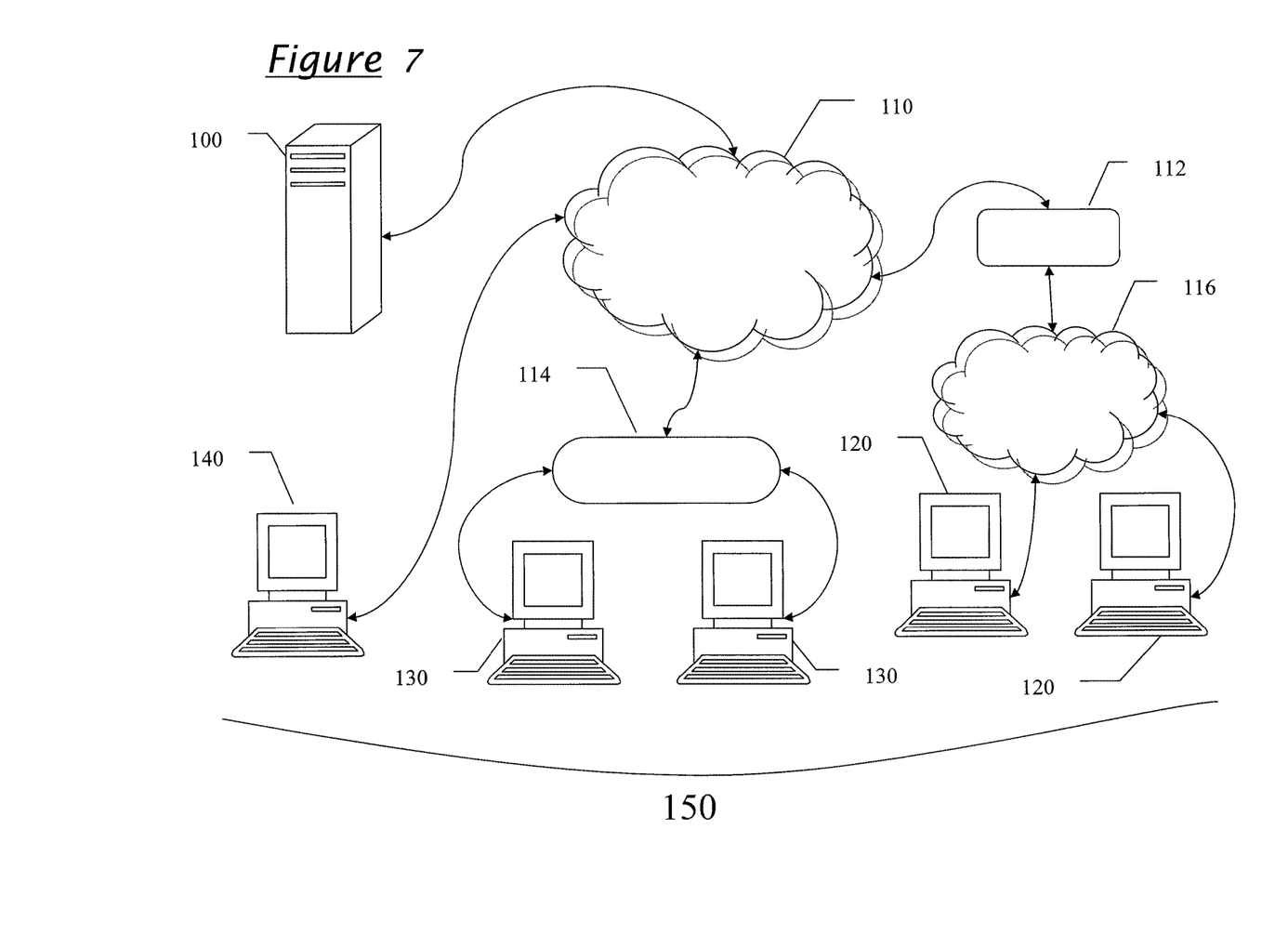
FIG. 7 is a block diagram of a network system on which an embodiment may operate.

Referring now to FIG. 7, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 8:
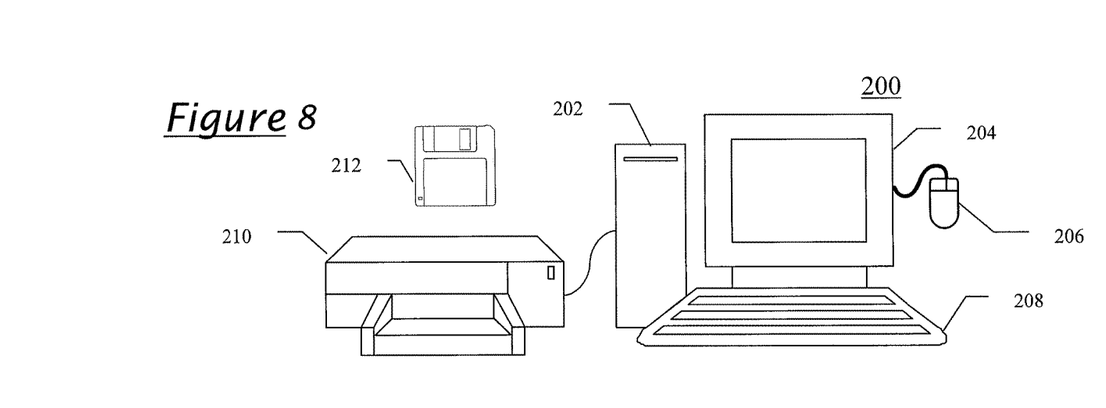
FIGS. 8 and 9 are block diagrams of an example computer system on which an embodiment may operate.
Figure 9:
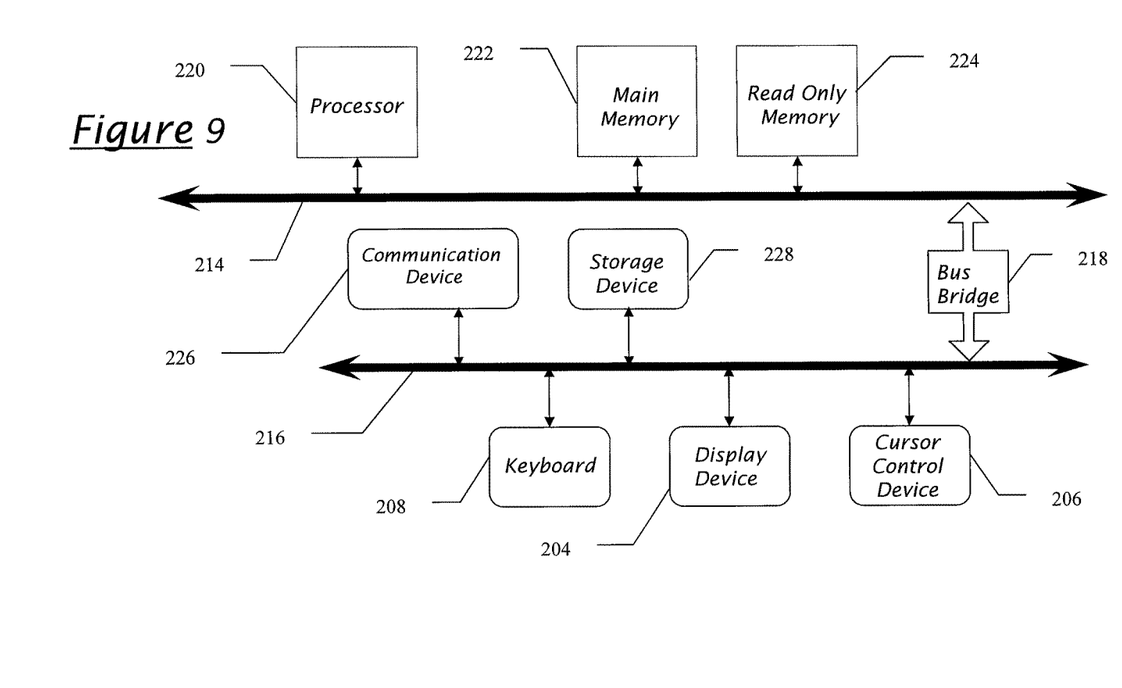

Having briefly described one embodiment of the network environment in which an example embodiment may operate, FIGS. 8 and 9 show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 7 and described above.

The system of an example embodiment includes software, information processing hardware, and various processing steps, which are described above. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and method for providing on-line advertising with dynamic content is disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:
1. A method comprising:
  obtaining, by a publisher system component, an advertisement template with an embedded region for dynamic content, the advertisement template also having a static region with corresponding static region boundaries, the static region displayed concurrently with the embedded region for a first dynamic content and a second dynamic content, the embedded region for the first dynamic content and the second dynamic content being embedded within the static region boundaries of the static region, the template including information identifying a network accessible source for the first dynamic content and the second dynamic content, the embedded region including a tag that provides a link to the network accessible source of the dynamic content, the tag including a mechanism for retrieving or subscribing to the dynamic content via the link, the link comprising a Uniform Resource Locator;
  retrieving, by the publisher system component, the first dynamic content and the second dynamic content from the network accessible source using the link prior to presentation of the static region to a user, the first dynamic content and the second dynamic content being retrieved subsequent to retrieval of the static region;

modifying, by use of a processor of the publisher system component, the embedded region of the advertisement template to include the first dynamic content and the second dynamic content, the combination of the static region and the modified embedded region representing a dynamic advertisement, the dynamic advertisement being renderable by a browser, the first dynamic content comprising the current bidding price of an item and the second dynamic content comprising time left for bidding on the item; and presenting the dynamic advertisement to the user.

2. The method as claimed in claim 1 wherein retrieving the first dynamic content or the second dynamic content includes pulling the dynamic content for the dynamic advertisement.

3. The method as claimed in claim 1 wherein retrieving the first dynamic content or the second dynamic content includes pushing the first dynamic content or the second dynamic content to the dynamic advertisement.

4. The method as claimed in claim 1 wherein the first dynamic content or the second dynamic content is displayed overlaid on the advertisement template.

5. The method as claimed in claim 1 wherein presenting the dynamic advertisement to a user includes rendering the dynamic advertisement on a website.

6. The method as claimed in claim 1 wherein presenting the dynamic advertisement to a user includes delivering the dynamic advertisement to an email server.

7. An apparatus comprising:

a processor;

an advertisement generator, executable by the processor, the advertisement generator being configured to obtain an advertisement template with an embedded region for dynamic content, the advertisement template also having a static region with corresponding static region boundaries, the static region displayed concurrently with the embedded region for a first dynamic content and a second dynamic content, the embedded region for the first dynamic content and the second dynamic content being embedded within the static region boundaries of the static region, the template including information identifying a network accessible source for the dynamic content, the embedded region including a tag that provides a link to the network accessible source of the first dynamic content and the second dynamic content, the tag including a mechanism for retrieving or subscribing to the dynamic content via the link, the link comprising a Uniform Resource Locator; to retrieve the first dynamic content and the second dynamic content from the network accessible source using the link prior to presentation of the static region to a user, the first dynamic content and the second dynamic content being retrieved subsequent to retrieval of the static region; to modify the embedded region of the advertisement template to include the first dynamic content and the second dynamic content, the combination of the static region and the modified embedded region representing a dynamic advertisement, the dynamic advertisement being renderable by a browser, the first dynamic content comprising the current bidding price of an item and the second dynamic content comprising time left for bidding on the item; and to present the dynamic advertisement to the user.

8. The apparatus as claimed in claim 7 being further configured to pull the first dynamic content or the second dynamic content for the dynamic advertisement.

9. The apparatus as claimed in claim 7 being further configured to push the first dynamic content or the second dynamic content to the dynamic advertisement.

10. The apparatus as claimed in claim 7 wherein the first dynamic content or the second dynamic content is displayed overlaid on the advertisement template.

11. The apparatus as claimed in claim 7 being further configured to render the dynamic advertisement on a website.

12. The apparatus as claimed in claim 7 being further configured to deliver the dynamic advertisement to an email server.

13. An article of manufacture comprising a non-transitory machine-readable storage medium having machine executable instructions embedded thereon, which when executed by a machine, cause the machine to:

obtain, by a publisher system component, an advertisement template with an embedded region for dynamic content, the advertisement template also having a static region with corresponding static region boundaries, the static region displayed concurrently with the embedded region for a first dynamic content and a second dynamic content, the embedded region for the first dynamic content and the second dynamic content being embedded within the static region boundaries of the static region, the template including information identifying a network accessible source for the first dynamic content and the second dynamic content, the embedded region including a tag that provides a link to the network accessible source of the dynamic content, the tag including a mechanism for retrieving or subscribing to the dynamic content via the link, the link comprising a Uniform Resource Locator;

retrieve, by the publisher system component, the first dynamic content and the second dynamic content from the network accessible source using the link prior to presentation of the static region to a user, the first dynamic content and the second dynamic content being retrieved subsequent to retrieval of the static region;

modify, by use of a processor of the publisher system component, the embedded region of the advertisement template to include the first dynamic content and the second dynamic content, the combination of the static region and the modified embedded region representing a dynamic advertisement, the dynamic advertisement being renderable by a browser, the first dynamic content comprising the current bidding price of an item and the second dynamic content comprising time left for bidding on the item; and present the dynamic advertisement to the user.

14. The article of manufacture as claimed in claim 13 being further configured to pull the first dynamic content or the second dynamic content for the dynamic advertisement.

15. The article of manufacture as claimed in claim 13 being further configured to push the first dynamic content or the second dynamic content to the dynamic advertisement.

16. The article of manufacture as claimed in claim 13 wherein the first dynamic content or the second dynamic content is displayed overlaid on the advertisement template.

17. The article of manufacture as claimed in claim 13 being further configured to render the dynamic advertisement on a website.

18. The article of manufacture as claimed in claim 13 being further configured to deliver the dynamic advertisement to an email server.

19. A system comprising:
a processor;
a memory coupled to the processor to store information related to user advertising;
an advertisement generator, executable by the processor, the advertisement generator being configured to obtain an advertisement template with an embedded region for dynamic content, the advertisement template also having a static region with corresponding static region boundaries, the static region displayed concurrently with the embedded region for a first dynamic content and a second dynamic content, the embedded region for the first dynamic content and the second dynamic content being embedded within the static region boundaries of the static region, the template including information identifying a network accessible source for the dynamic content, the embedded region including a tag that provides a link to the network accessible source of the first dynamic content and the second dynamic content, the tag including a mechanism for retrieving or subscribing to the dynamic content via the link, the link comprising a Uniform Resource Locator; to retrieve the first dynamic content and the second dynamic content from the network accessible source using the link prior to presentation of the static region to a user, the first dynamic content and the second dynamic content being retrieved subsequent to retrieval of the static region; to modify the embedded region of the advertisement template to include the first dynamic content and the second dynamic content, the combination of the static region and the modified embedded region representing a dynamic advertisement, the dynamic advertisement being renderable by a browser, the first dynamic content comprising the current bidding price of an item and the second dynamic content comprising time left for bidding on the item; and to present the dynamic advertisement to the user.

* * * * *